(12) United States Patent
Pasam et al.

(10) Patent No.: US 10,805,439 B2
(45) Date of Patent: Oct. 13, 2020

(54) COMMUNICATING DATA MESSAGES UTILIZING A PROPRIETARY NETWORK

(71) Applicant: Xaptum, Inc., Chicago, IL (US)

(72) Inventors: Rohit Pasam, Chicago, IL (US);
Venkatakumar Srinivasan, Chicago, IL (US); Pradeep Srinivas Barthur, White Plains, NY (US); Gary W. Grube, Barrington Hills, IL (US); Mario Frank DeRango, Cary, IL (US)

(73) Assignee: Xaptum, Inc., Chicago, IL (US)

( * ) Notice: Subject to any disclaimer, the term of this patent is extended or adjusted under 35 U.S.C. 154(b) by 0 days.

(21) Appl. No.: 16/388,094

(22) Filed: Apr. 18, 2019

(65) Prior Publication Data
US 2019/0335022 A1    Oct. 31, 2019

Related U.S. Application Data

(60) Provisional application No. 62/664,406, filed on Apr. 30, 2018.

(51) Int. Cl.
*G06F 15/16* (2006.01)
*H04L 29/06* (2006.01)
*H04L 29/08* (2006.01)

(52) U.S. Cl.
CPC .............. *H04L 69/28* (2013.01); *H04L 67/12* (2013.01); *H04L 67/147* (2013.01); *H04L 69/324* (2013.01)

(58) Field of Classification Search
CPC ....... H04L 69/28; H04L 69/324; H04L 67/12; H04L 67/147
See application file for complete search history.

(56) References Cited

U.S. PATENT DOCUMENTS

| 5,410,475 A | 4/1995 | Lu |
| 5,978,386 A | 11/1999 | Haemaelaeinen |

(Continued)

FOREIGN PATENT DOCUMENTS

| EP | 0931418 A2 | 7/1999 |
| EP | 1856602 A2 | 11/2007 |

(Continued)

OTHER PUBLICATIONS

Handley, et al., SIP: Session Initiation Protocol, Mar. 1999, www.rfc-base.org., RFC2543.

(Continued)

*Primary Examiner* — Hieu T Hoang
(74) *Attorney, Agent, or Firm* — Garlick & Markison; Gary W. Grube

(57) ABSTRACT

A method includes a source computing device receiving an actual transmission time of a previous data message sent from the source computing device to a target computing device. When the actual transmission time is within a timing tolerance of a desired transmission time, the method further includes setting a transmission change indicator for a next data message to no-change. When the actual transmission time is greater than the timing tolerance plus the desired transmission time, the method further includes and setting the transmission change indicator to increase transmission speed. When the actual transmission time is less than the desired transmission time minus the timing tolerance, the method further includes setting the transmission change indicator to decrease transmission speed.

22 Claims, 8 Drawing Sheets

(56) References Cited

U.S. PATENT DOCUMENTS

| | | | |
|---|---|---|---|
| 6,097,794 A | 8/2000 | Suffern | |
| 6,430,184 B1 | 8/2002 | Robins | |
| 6,651,099 B1 | 11/2003 | Dietz | |
| 6,661,431 B1 | 12/2003 | Stuart | |
| 6,667,700 B1 | 12/2003 | McCanne | |
| 6,721,333 B1 | 4/2004 | Milton | |
| 6,859,835 B1 | 2/2005 | Hipp | |
| 7,120,790 B1 | 10/2006 | Lopresti | |
| 7,319,847 B2 | 1/2008 | Xanthos | |
| 7,590,715 B1 | 9/2009 | Raanan | |
| 8,073,973 B2 | 12/2011 | McCann | |
| 8,291,058 B2 | 10/2012 | Head | |
| 8,321,434 B1 | 11/2012 | Ren | |
| 9,887,911 B2 | 2/2018 | Pasam | |
| 10,367,724 B1* | 7/2019 | Kartheek | H04L 45/22 |
| 2002/0085575 A1 | 7/2002 | Smith | |
| 2002/0176378 A1 | 11/2002 | Hamilton | |
| 2003/0140140 A1 | 7/2003 | Lahtinen | |
| 2004/0128552 A1 | 7/2004 | Toomey | |
| 2005/0005145 A1 | 1/2005 | Teixeira | |
| 2005/0243830 A1* | 11/2005 | Wrenn | H04L 45/22 370/394 |
| 2006/0092930 A1 | 5/2006 | Shah | |
| 2006/0126510 A1 | 6/2006 | Russell | |
| 2006/0200478 A1* | 9/2006 | Pasztor | G06Q 10/00 |
| 2007/0195780 A1 | 8/2007 | Cabeca | |
| 2008/0115149 A1 | 5/2008 | Rupp | |
| 2009/0063625 A1 | 3/2009 | Bagepalli | |
| 2009/0070779 A1 | 3/2009 | Wang | |
| 2009/0097506 A1 | 4/2009 | Subrahmanyan | |
| 2009/0168760 A1 | 7/2009 | Katis | |
| 2009/0199210 A1 | 8/2009 | Smith, Jr. | |
| 2009/0222590 A1 | 9/2009 | Van Aken | |
| 2009/0323703 A1 | 12/2009 | Bragagnini | |
| 2009/0323718 A1 | 12/2009 | Oren-Dahan | |
| 2010/0023524 A1 | 1/2010 | Gladwin | |
| 2010/0095367 A1 | 4/2010 | Narayanaswamy | |
| 2010/0233961 A1 | 9/2010 | Holden | |
| 2011/0070868 A1 | 3/2011 | Scholz | |
| 2011/0145181 A1 | 6/2011 | Pandya | |
| 2011/0228744 A1 | 9/2011 | Cai | |
| 2011/0264657 A1 | 10/2011 | Hoffman | |
| 2012/0102055 A1 | 4/2012 | Hu | |
| 2012/0120967 A1 | 5/2012 | Ghiasi | |
| 2012/0210426 A1 | 8/2012 | Yu | |
| 2012/0253728 A1 | 10/2012 | Chamas | |
| 2012/0317300 A1* | 12/2012 | Huang | H04N 21/64738 709/231 |
| 2013/0094451 A1 | 4/2013 | Pavlovski | |
| 2013/0111217 A1 | 5/2013 | Kopasz | |
| 2013/0136127 A1 | 5/2013 | Hill | |
| 2013/0211555 A1 | 8/2013 | Lawson | |
| 2013/0304616 A1 | 11/2013 | Raleigh | |
| 2013/0322626 A1 | 12/2013 | Yang | |
| 2014/0006632 A1 | 1/2014 | Evens | |
| 2014/0028462 A1 | 1/2014 | Lawson | |
| 2014/0280829 A1 | 9/2014 | Kjendal | |
| 2015/0156266 A1 | 6/2015 | Gupta | |
| 2016/0119198 A1 | 4/2016 | Kfir | |
| 2016/0210578 A1 | 7/2016 | Raleigh | |
| 2016/0218979 A1* | 7/2016 | Roh | H04L 43/16 |
| 2017/0026469 A1 | 1/2017 | Usgaonkar | |
| 2017/0085485 A1* | 3/2017 | Vanini | H04L 47/762 |
| 2018/0026873 A1 | 1/2018 | Cheng et al. | |

FOREIGN PATENT DOCUMENTS

| | | | |
|---|---|---|---|
| EP | 1446906 B1 | 12/2007 | |
| WO | 0049481 A2 | 8/2000 | |

OTHER PUBLICATIONS

International Search Report corresponding to International Patent Application Serial No. PCT/US14/19595, United States Patent and Trademark Office, dated Feb. 28, 2014; (4 pages).

International Written Opinion corresponding to International Patent Application Serial No. PCT/US14/19595, United States Patent and Trademark Office, dated Feb. 28, 2014; (5 pages).

* cited by examiner

COMMUNICATING DATA MESSAGES UTILIZING A PROPRIETARY NETWORK

CROSS REFERENCE TO RELATED PATENTS

The present U.S. Utility Patent Application claims priority pursuant to 35 U.S.C. § 119(e) to U.S. Provisional Application No. 62/664,406, entitled "PRIORITIZING COMMUNICATION QUALITY LEVELS ASSOCIATED WITH MESSAGES OF A SESSION," filed Apr. 30, 2018, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to data communication systems.

Description of Related Art

The use of computers to communicate text files, voice files, multimedia files, and even live data streaming is known. Most computers utilize the Internet protocol (IP) to communicate via the Internet. The Internet protocol is known to be the primary network communications protocol utilized on the Internet, where IP provides a network layer protocol in accordance with one or more industry standards such as transmission control protocol (TCP), user datagram protocol (UDP), and stream control transmission protocol (SCTP).

It is also known for computers to utilize a transport protocol on top of the network layer protocol to transport data between computing devices, where the transport protocol is in accordance with one or more industry standard session protocols such as hypertext transfer protocol (HTTP) and Message queue telemetry transport (MQQT). Further industry standards have resulted in a focus on so-called constrained devices where lower power devices and lossy networks may be joined by the Internet. One such resulting industry standard is the constrained application protocol (CoAP) which provides a service layer protocol over the session protocol HTTP over the network layer protocol UDP. Computers are generally required to understand the protocol and data format from the various devices connected to the same network.

BRIEF DESCRIPTION OF THE SEVERAL VIEWS OF THE DRAWING(S)

Figure 5A:
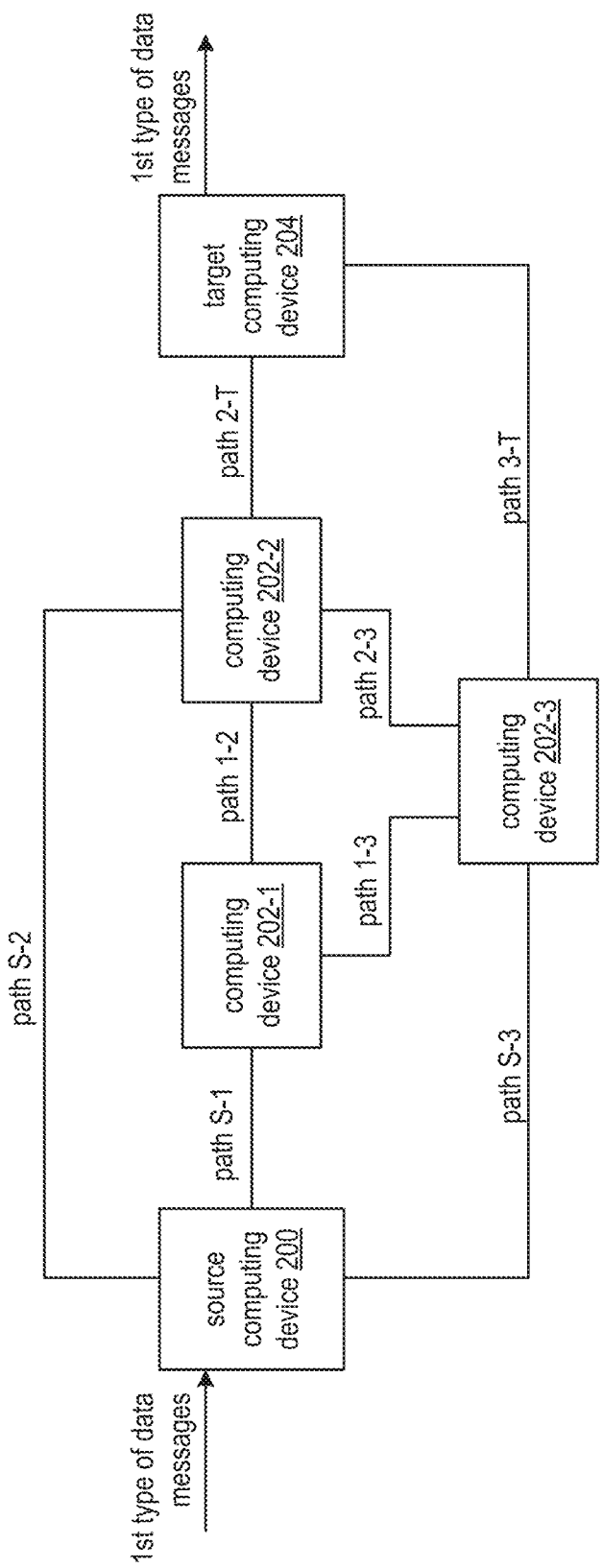
Figure 5B:
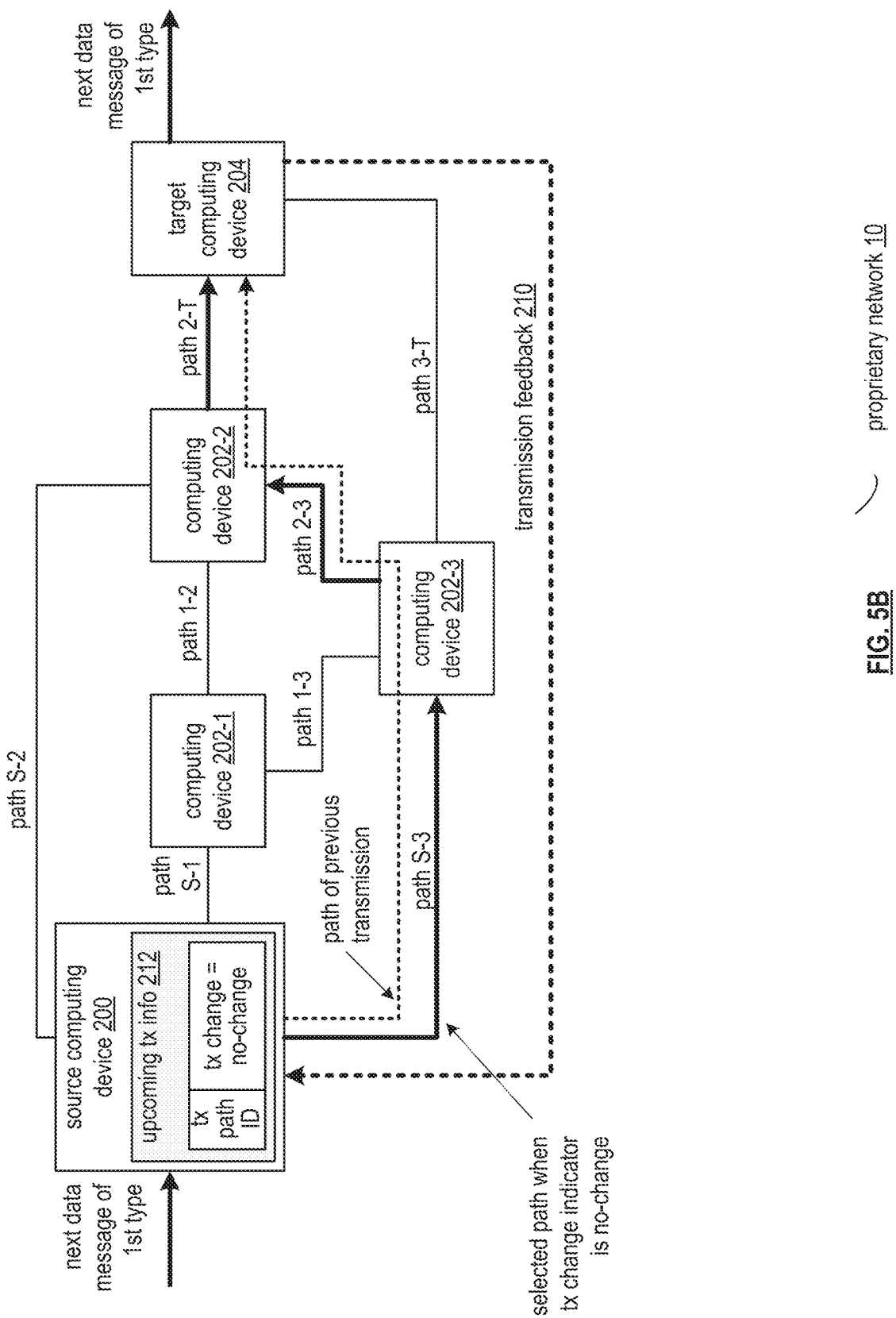
Figure 5C:
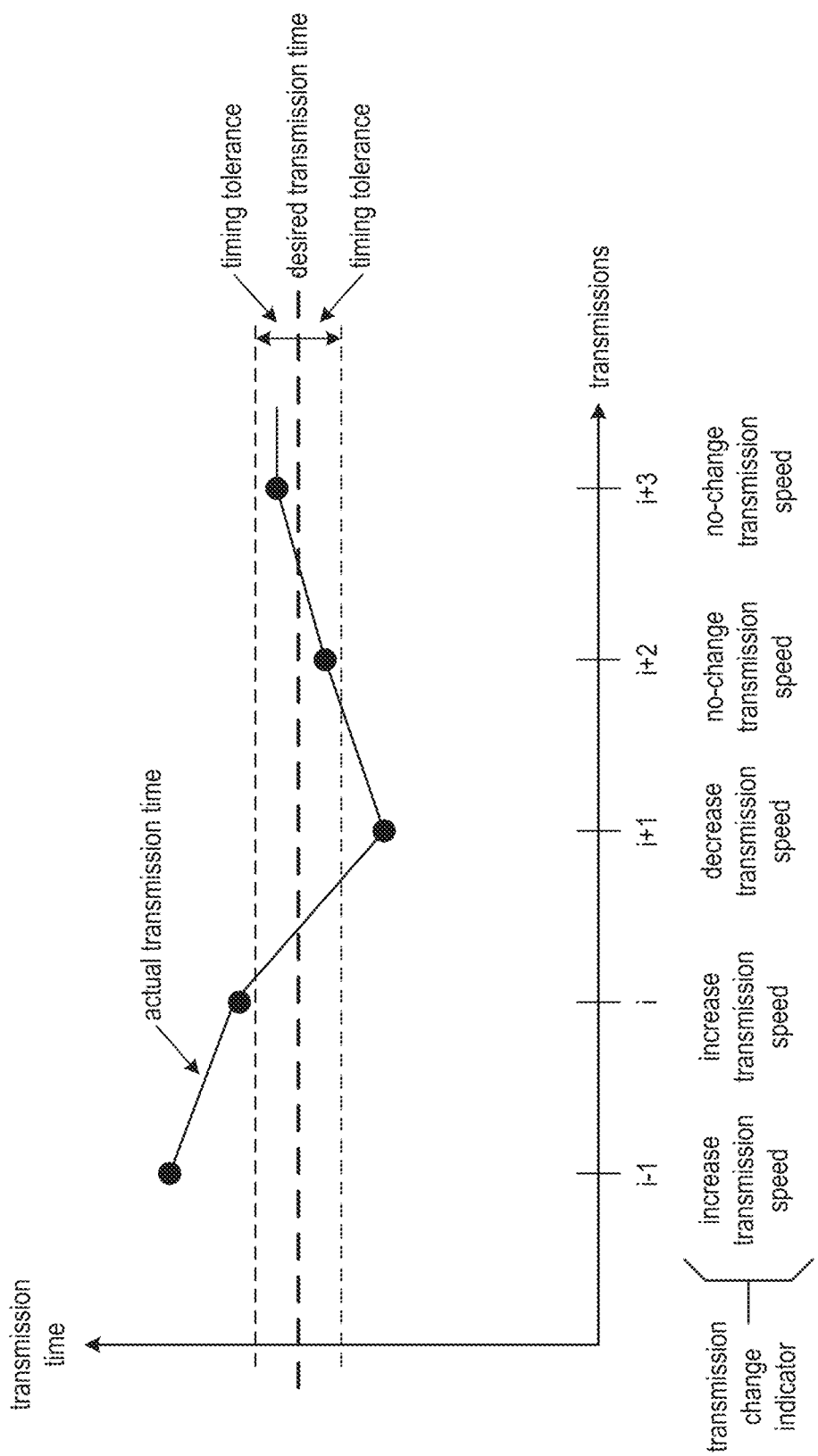

FIGS. 5A, 5B, 5D, and 5E are schematic block diagrams of embodiments of a proprietary network illustrating methods to communicate data messages in accordance with the present invention; and FIG. 5C is a timing diagram illustrating an example of establishing a transmission change indicator when communicating data messages in a proprietary network in accordance with the present invention.

DETAILED DESCRIPTION OF THE INVENTION

Figure 1:
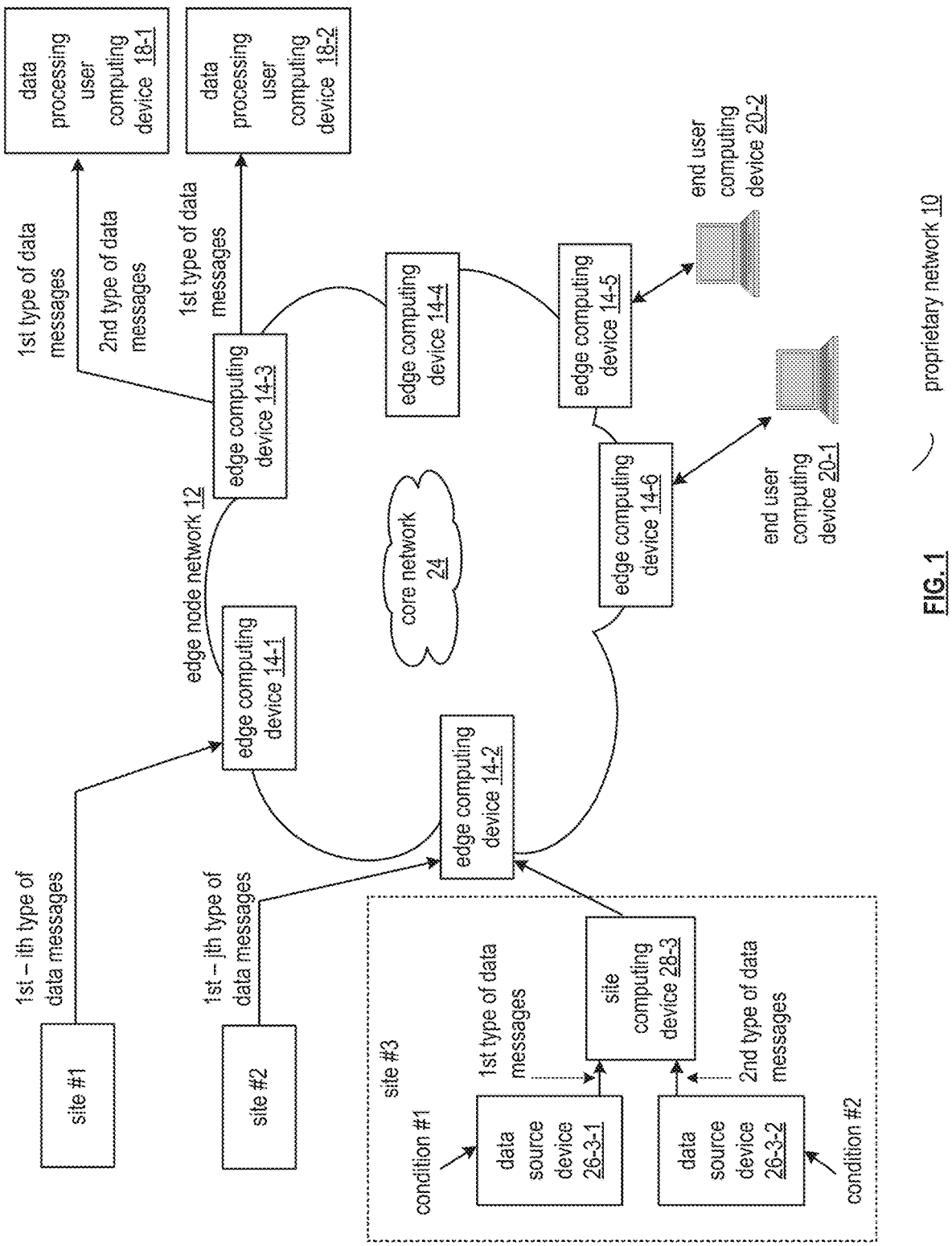
FIG. 1 is a schematic block diagram of an embodiment of a proprietary network in accordance with the present invention.

FIG. 1 is a schematic block diagram of an embodiment of a proprietary network 10 that includes an edge node network 12, a plurality of sites #1 through #3, a core network 24, a plurality of data processing user computing devices 18-1 through 18-2, and a plurality of end user computing devices 20-1 through 20-2. The core network 24 includes at least one of the Internet, a public radio access network (RAN), and any private network. The edge node network 12 includes a plurality of edge computing devices 14-1 through 14-6 which utilize the core network 24 to communicate with each other.

Alternatively, the edge computing devices may communicate directly with each other by utilizing various access technologies including one or more of T-carrier/E-carrier (T1/E1), Digital Subscriber Line (DSL), Metro Ethernet, Hybrid Fiber Coax (HFC), and optical fiber. For instance, a transport protocol such as Multiprotocol Label Switching (MPLS), Asynchronous Transport Mode (ATM), or frame relay provides communications between distant edge computing devices over the access technology.

The sites include one or more data source devices and a site computing device for monitoring various conditions within a geographic area associated with each site. Each site may be associated with at least a portion of a facility (e.g., a home, an apartment, a store, a school, a hospital, a hotel, an office, a factory, a refinery, a farm plot, an airport, a water treatment plant, electrical generation and/or transmission complex, an oil exploration facility, etc.). For example, site #3 includes site computing device 28-3 and data source devices 26-3-1 and 26-3-2. Each data source device is capable of detecting at least one condition, generating data based on the condition (e.g., on both a continual basis or when requested), and sending the data as data messages to an associated site computing device. The site computing device temporary stores and shares, via the edge node network 12, the data messages with various data processing user computing devices and end user computing devices. The site computing device determines which of the various data processing user computing devices and end user computing devices to share the data with based on authorized requests for the data.

The data includes one or more of sensor data associated with the condition of a local environment (e.g., a site) and use data (e.g., statistical usage data, user identifiers, error messages, alerts, warnings, level information, etc.) associated with a mechanism (e.g., a machine, a local computer, etc.). The sensor data further includes raw sensor data (e.g., directly from the sensor) and an interpretation of the raw sensor data (e.g., a summary, a result of applying an algorithm to the raw sensor data). The data still further includes data retrieved from a memory device associated with the data source device and any other data produced by the data source device.

The data source device generates the data messages by type. The type includes an association with a particular type of data such as error code data, weather data, smart grid control data, etc. The various types of data are associated with various priority levels. The priority level includes an absolute priority level and a relative priority level (e.g., two other data types). The priority level is utilized to establish a performance level of sending the data messages from the data source device to the user computing device (e.g., data processing user computing devices and end user computing devices).

The performance includes a variety of performance factors associated with delivery of the data messages. The performance factors include transmission speed (e.g., transmission latency) and transmission bandwidth (e.g., message capacity) through the proprietary network 10. In a first embodiment of prioritizing performance, a priority level for a particular data type has an associated desired performance level. For example, when the data is of a first type of data message (e.g., real-time smart grid information), the transmission latency has a desired transmission time (e.g., a goal for an elapsed time from receipt of the data message to delivery of the data message to the user computing device) of 20 ms. As another example, when the data is of a second type of data message (e.g., home appliance usage information), the transmission latency has a second desired transmission time of 200 ms.

In a second embodiment of prioritizing performance, the desire performance level is a function of a requirement of the recipient computing device. For example, the data processing user computing device 18-1 has a desired transmission time for the first type of data messages (e.g., the real-time smart grid information) of 20 ms and the data processing user computing device 18-2 has a desired transmission time for the same first type of data messages of 50 ms.

The edge computing devices of the edge node network 12 route the requests for the data from the data processing user computing devices and the end user computing devices to the site computing devices. The edge computing devices further routes the data from the site computing devices to the data processing user computing devices and end user computing devices associated with the requests for the data. The routing by the edge computing devices is based on various authentication and authorization techniques to ensure that only authorized user computing devices (e.g., end user computing devices and/or data processing user computing devices) are allowed to access data from the data source devices. Thus, the edge node network 12 provides additional data transport security beyond the core network 24.

The data processing user computing devices 18-1 and 18-2 request the data and process the data to produce process data. The processing of the data includes executing various data applications utilizing the data, storing the data, utilizing the data as inputs to an operational control system to provide a service, and using the data in a hosted data application. The requesting of the data is in accordance with needs of the various applications and services.

The end user computing devices 20-1 and 20-2 request the data and further request results of the processing of the data. For example, the end user computing devices control the various data applications hosted by the data processing user computing devices and receive results of execution of the data applications (e.g., receive the processed data).

The site computing devices, edge computing devices, data processing user computing devices and end user computing devices may be implemented with a computing entity. A computing entity includes a cluster of one or more computing devices. For example, a first computing entity may be implemented to include the site computing device 28-3 and the edge computing device 14-2.

Figure 2:
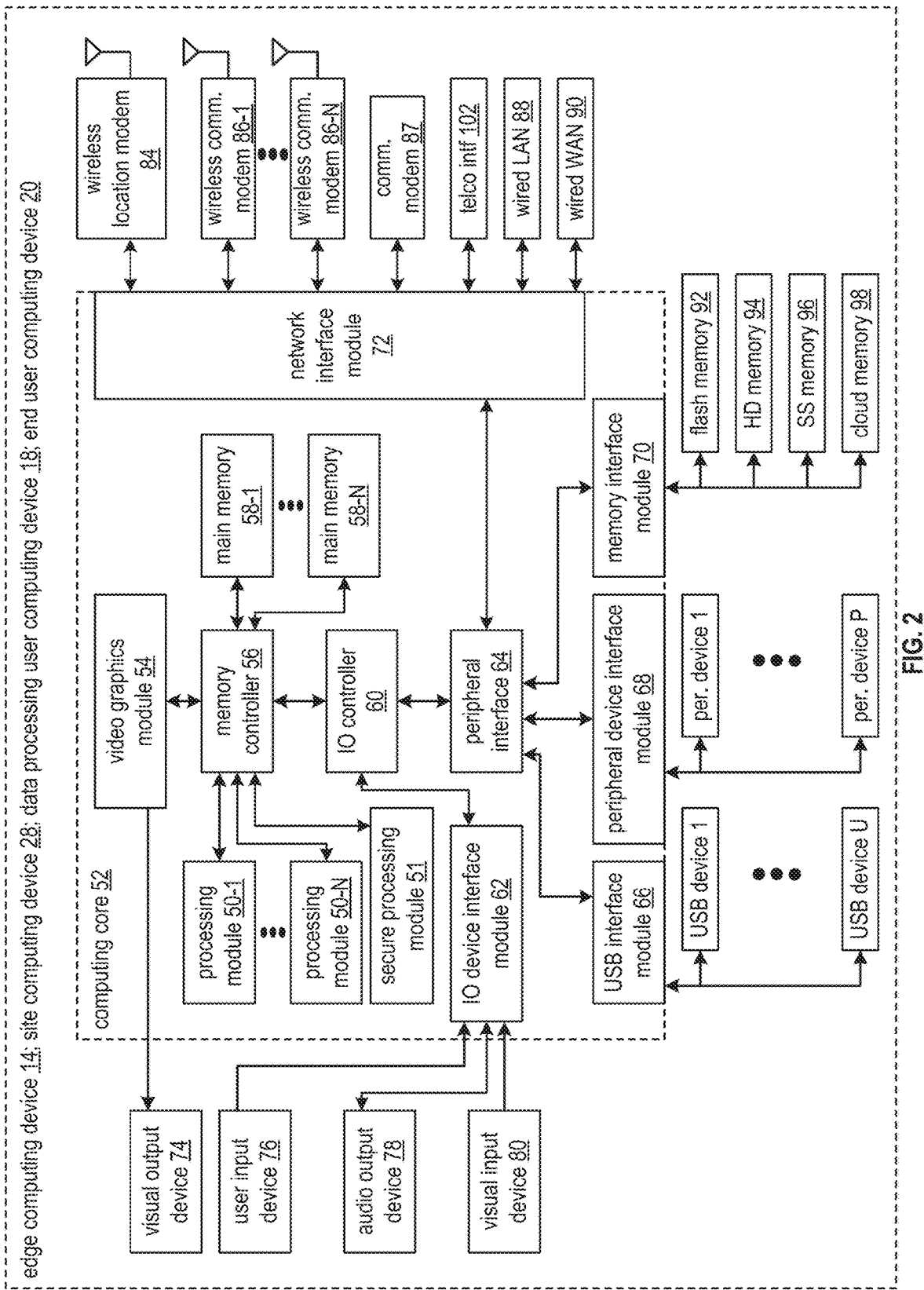
FIG. 2 is a schematic block diagram of various computing devices of a proprietary network in accordance with the present invention.

Each computing device includes one or more computing cores and each computing core includes one or more processing modules along with memory and input/output support devices and/or modules as illustrated in FIG. 2. In general, a computing core is any electronic device that can communicate data, process data, and/or store data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices include a personal computer (PC), a computer server, a cable set-top box, a satellite receiver, a television set, a printer, a home appliance, home entertainment equipment, a security camera controller, a video game console, a critical infrastructure controller, and/or any type of home, office or cloud computing equipment that includes a computing core.

The proprietary network 10 generally supports secure routing of the data from the sites to the user computing devices based on security procedures, synchronization parameters, and configuration information. Examples of the security procedures includes identifying computing devices, challenging identity through authentication, producing encryption keys, securely exchanging authentication information, encrypting computing device identifiers, and encrypting data for transmission, while preserving device anonymity when desired. The encrypting of the data includes utilization of encryption keys with an encryption algorithm.

The synchronization parameters include one or more of control information, configuration information, and analytics information. The control information includes operational mode information and routing information (e.g., routes). The operational mode information includes how a computing device is to operate, i.e. as an edge computing device and/or as a site computing device. The operational mode information further includes which functions are to be supported by the computing device (e.g., routing, security, ingress support, egress support, pass-through support).

The configuration information includes deployment information, software information, security information, routing information, addressing information, protocol information, and presence information. The deployment information includes lists of logical connection paths between edge computing devices, data source devices associated with a particular edge computing device or site computing device, data source devices associated with particular data processing user computing devices, data source devices associated with particular applications and/or storage facilities of a particular data processing user computing device, etc.

The software information includes software version lists and software for site computing devices and edge computing devices. The security information includes public-private encryption keys, key generation values, key seeds, key identifiers, encryption algorithm identifiers, updated encryption algorithms, hardware-embedded secret keys, etc.

The routing information includes status of routes between edge computing devices, physical links between edge computing devices, etc. The addressing information includes identifiers of data source devices, identifiers of site computing devices and edge computing devices, and identifiers of sites, etc.

The protocol information includes desired protocol(s) for an application supported by the data processing user computing devices 18-1 and 18-2, data protocol identifiers associated with messages that traverse the edge node network 12 carrying data and more, and data protocols supported by the data source devices, etc. The presence information includes real-time status of computing devices of the proprietary network 10 and historical status information of the computing devices.

The analytics information includes summaries of use of the proprietary network 10 and portions of the data. The summaries include a list of data types of the data being communicated on the proprietary network 10, historical patterns of the data type communication, and historical usage patterns of the proprietary network 10 to communicate data on behalf of each data source device, etc. The portions of the data include random samples of data, targeted samples of the data, and data associated with a particular historical pattern.

FIG. 2 is a schematic block diagram of various computing devices of the proprietary network 10 of FIG. 1. In an embodiment, the edge computing devices 14, the site computing devices 28, the data processing user computing devices 18, and the end user computing devices 20 include a computing core 52, one or more visual output devices 74 (e.g., video graphics display, touchscreen, LED, etc.), one or more user input devices 76 (e.g., keypad, keyboard, touchscreen, voice to text, a push button, a microphone, etc.), one or more audio output devices 78 (e.g., speaker(s), headphone jack, a motor, etc.), and one or more visual input devices 80 (e.g., camera, photocell, etc.).

The computing devices further include one or more universal serial bus (USB) devices (USB devices 1-U), one or more peripheral devices (e.g., peripheral devices 1-P), and one or more memory devices (e.g., one or more flash memory devices 92, one or more hard drive (HD) memories 94, one or more solid state (SS) memory devices 96, and/or cloud memory 98). The computing devices further include one or more wireless location modems 84 (e.g., global positioning satellite (GPS), Wi-Fi, angle of arrival, time difference of arrival, signal strength, dedicated wireless location, etc.), and one or more wireless communication modems 86-1 through 86-N (e.g., a cellular network transceiver, a wireless data network transceiver, a Wi-Fi transceiver, a Bluetooth transceiver, a 315 MHz transceiver, a zig bee transceiver, a 60 GHz transceiver, etc.). The computing devices further include a telco interface 102 (e.g., to interface to a public switched telephone network), a wired local area network (LAN) 88 (e.g., optical, electrical), a wired wide area network (WAN) 90 (e.g., optical, electrical), and a communication modem 87 (e.g., facilitating wireless and/or wireline communications of data)

The computing core 52 includes a video graphics module 54, one or more processing modules 50-1 through 50-N, a secure processing module 51 (e.g., storing keys and executing encryption algorithms), a memory controller 56, one or more main memories 58-1 through 58-N (e.g., RAM as local memory), and one or more input/output (I/O) device interface modules 62. The computing core 52 further includes an input/output (I/O) controller 60, a peripheral interface 64, one or more USB interface modules 66, one or more network interface modules 72, one or more memory interface modules 70, and/or one or more peripheral device interface modules 68.

Each of the interface modules 62, 66, 68, 70, and 72 includes a combination of hardware (e.g., connectors, wiring, etc.) and operational instructions stored on memory (e.g., driver software) that are executed by one or more of the processing modules 50-1 through 50-N and/or a processing circuit within the interface module. Each of the interface modules couples to one or more components of the computing devices. For example, one of the IO device interface modules 62 couples to an audio output device 78. As another example, one of the memory interface modules 70 couples to flash memory 92 and another one of the memory interface modules 70 couples to cloud memory 98 (e.g., an on-line storage system and/or on-line backup system).

In other embodiments, the computing devices may include more or less devices and modules than shown in this example embodiment. The secure processing module 51 (e.g., a Trusted Platform Module (TPM)) includes a hardware module for securely generating and storing security parameters (e.g., encryption keys) when required for secure attestation and authenticated access to the edge node network 12 and cannot be tampered with by application software.

Figure 3:
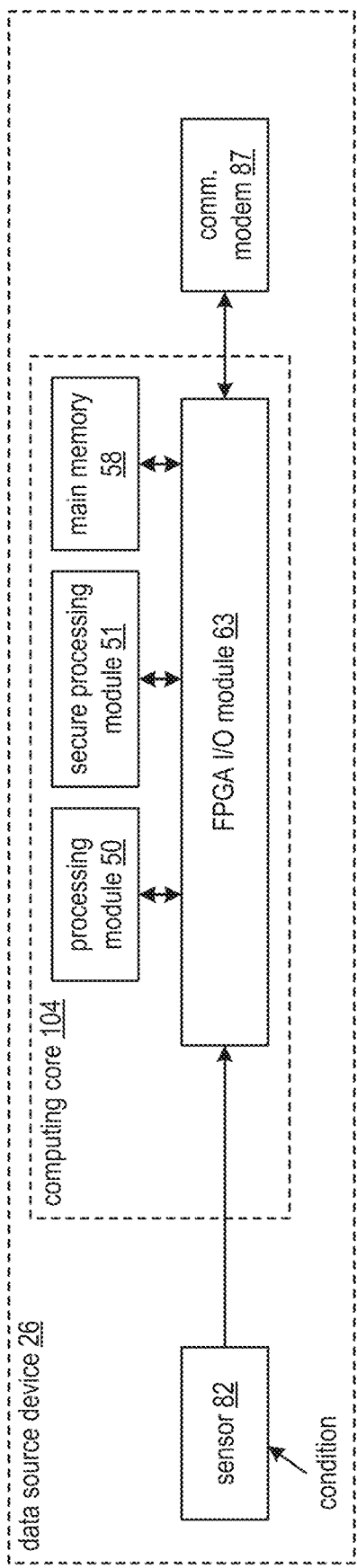
FIGS. 3 and 4 are schematic block diagrams of embodiments of a data source device of a proprietary network in accordance with the present invention.
Figure 4:
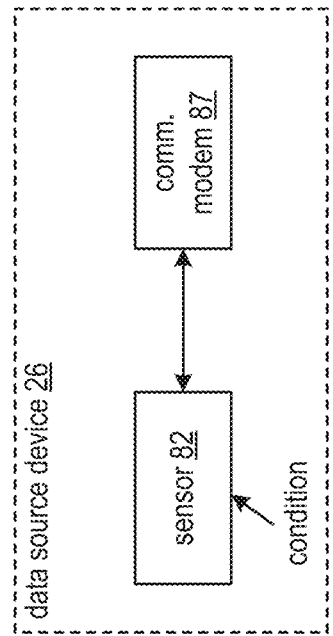

FIGS. 3 and 4 are schematic block diagrams of embodiments of a data source device of a proprietary network. FIG. 3 is a schematic block diagram of an embodiment of the data source device 26 of FIG. 1. The data source device 26 includes a sensor 82, a computing core 104, and the communication modem 87 of FIG. 2. The computing core 104 includes at least one processing module 50 of the processing modules 50-1 through 50-N of FIG. 2, the secure processing module 51 of FIG. 2, at least one main memory 58 of the main memories 58-1 through 58-N of FIG. 2, and one or more Field Programmable Gate Array (FPGA) input/output (I/O) modules 63. In other embodiments, the device may include more or less devices and modules than shown in this example embodiment. For example, two or more sensors 82. In other embodiments, the data source device 26 includes more or less devices and modules than shown in this example embodiment. For instance, the computing core 104 only includes the FPGA I/O module 63.

The sensor 82 interprets the condition to provide sensor data to the computing core 104. The computing core 104 generates data based on the sensor data of the condition and sends, via the communication modem 87, the data to an associated site computing device or other device. For instance, the processing module 50 controls the FPGA I/O module 63 to route the sensor data to the main memory 58 for temporary storage. The processing module 50 subsequently routes, via the FPGA I/O module 63, the temporarily stored sensor data from the main memory 58 to the secure processing module 51 for encryption to produce encrypted data. The encryption is performed utilizing a selected encryption algorithm and encryption key stored within the secure processing module 51.

Having facilitated encryption of the data, the processing module 50 further facilitates routing, via the FPGA I/O module 63, of the encrypted data from the secure processing module 51 to the communication modem 87 for transmission to the associated site computing device. Alternatively, the processing module 50 further facilitates routing, via the FPGA I/O module 63, the encrypted data from the secure processing module 51 to the main memory 58 for temporary storage until the communication modem 87 is ready to transmit the encrypted data.

FIG. 4 illustrates another embodiment of the data source device 26 of FIG. 3. The data source device 26 includes the sensor 82 of FIG. 3 and the communication modem 87 of FIG. 2. In an example of operation, the sensor 82 interprets the condition to produce the sensor data and sends the sensor data to the communication modem 87 for transmission to the associated site controller device, or other device, as one or more data messages.

FIGS. 5A, 5B, 5D, and 5E are schematic block diagrams of embodiments of a proprietary network illustrating methods to communicate data messages in accordance with the present invention. The proprietary network 10 includes a source computing device 200, a plurality of computing devices 202-1 through 202-3, and a target computing device 204. In various embodiments, the source computing device 200 is implemented as one of the data source device 26 of FIG. 1, the site computing device 28 of FIG. 1, and the edge computing device 14 of FIG. 1. In a still further embodiment, the source computing device 200 is implemented as a computing entity that includes a combination of two or more of the data source device 26, the site computing device 28, and the edge computing device 14. For example, the source computing device 200 is implemented as a computing entity that includes the site computing device 28 and the edge computing device 14 of FIG. 1.

Each of the computing devices 202-1 through 202-3 may be implemented utilizing edge computing devices 14 of FIG. 1 that relay data messages between the source computing device 200 and the target computing device 204. In various embodiments, the target computing device 204 is implemented as one of the edge computing device 14 of FIG. 1, the data processing user computing device 18 of FIG. 1, and the end user computing device 20 of FIG. 1. In a still further embodiment, the target computing device 204 is implemented as a computing entity that includes a combination of two or more of the edge computing device 14 of FIG. 1, the data processing user computing device 18 of FIG. 1, and the end user computing device 20 of FIG. 1. For example, the target computing device 204 is implemented as a computing entity that includes the edge computing device 14 and the data processing user computing device 18 of FIG. 1.

FIG. 5A illustrates an embodiment of the proprietary network that conveys data messages from the source computing device 200 to the target computing device 204. For example, the proprietary network conveys a first type of data messages that includes smart grid information from a data source device 26 of FIG. 1. Similarly, the proprietary network conveys further types of data from the source computing device 200 to the target computing device 204 (e.g., a second type of data messages that includes home appliance use information, etc.).

The conveying of the data messages includes sending the data messages via a transmission path from the source computing device 200 to the target computing device 204. The transmission path includes one or more paths between the computing devices of the proprietary network 10. The transmission path further includes positioning of data messages within transmission queues of each computing device where a transmission queue is utilized to sequence the transmission of data messages in accordance with a transmission priority level. For instance, a data message is queued to be transmitted sooner when associated with a higher transmission priority level than other queued data messages within a particular computing device.

The paths between the computing devices includes physical paths (e.g., via a particular communication link of the core network 24 or other) and logical paths (e.g., sessions and ports established over one or more physical paths to provide communication connectivity). The computing devices 202-1 through 202-3 are coupled to other computing devices. The source computing device 200 and target computing device 204 are coupled with at least one other computing device. Two computing devices that are coupled include at least one path between them. For example, the source computing device 200 is coupled via path S-1 to the computing device 202-1. Alternatively, the source computing device 200 may be coupled via a second path S-1-2 to the computing device 202-1 when two paths are utilized.

The one or more paths between the computing devices are established in accordance with configuration information of the proprietary network. The configuration information is established to enable the providing of desired performance levels of the conveying of the data through the proprietary network. The configuration information is periodically updated to respond to a need for improved performance when an undesired performance is detected (e.g., a bottleneck between two or more computing devices of the proprietary network is discovered).

An identifier of the transmission path includes one or more of identifiers of each of the paths that make up the transmission path and transmission priority levels. For example, the identifier of the transmission path between the source computing device 200 and the target computing device 204 includes identifiers for paths S-3, 2-3, and 2-T when the transmission path includes the source computing device 200 transmitting the data messages to the computing device 202-3, the computing device 202-3 transmitting the data messages to the computing device 202-2, and the computing device 202-2 transmitting the data messages to the target computing device 204. In an alternative embodiment, the identifier of the transmission path further includes message queuing position information (e.g., a queue depth entry point).

The transmission path affects the actual transmission time from the receipt of the data message by the source computing device 200 to the delivery of the data message by the target computing device 204. Each of the paths that make up the transmission path is associated with unique transmission times. The unique transmission times result from one or more of capacity of the physical and/or logical paths, transmission time through the path, the current loading level of the path, and a message queuing wait time within a computing device.

The computing devices of the proprietary network select a path for the conveying of the data messages. The selecting of the path includes selecting which alternative path between computing devices to utilize for a next data message and in some embodiments further includes what level of transmission priority (e.g., outbound transmit queuing position). For example, the source computing device 200 selects between alternative paths S-2, S-1, and S-3 for sending of the next data message.

The selecting of the path is based on feedback of actual performance of delivering one or more previous data messages of the data messages of the type. For example, the source computing device 200 selects one of the three possible paths based on an actual performance level of delivering a previous fifty data messages of the same type (e.g., all smart grid information) compared to a desired performance level.

The selecting of the path is further based on the identity of the transmission path associated with transmission of the previous data message. For example, the computing devices select paths of a previous path when the feedback indicates that an actual transmission time is substantially the same as a desired transmission time. For instance, identical physical paths and similar message queuing entry points are selected. In another example, the computing devices select paths that are estimated to be faster than the previous path when the feedback indicates that the actual transmission time was slower than the desired transmission time. For instance, faster physical paths and higher priority message queuing entry points are selected. In yet another example, the computing devices select paths that are estimated to be slower than the previous path when the feedback indicates that the actual transmission time was faster than the desired transmission time. For instance, slower physical paths and lower priority message queuing entry points are selected.

FIG. 5B illustrates an example of the conveying of the data messages where the actual transmission time of the previous data message was substantially the same as the desired transmission time. The example includes the source computing device 200 receiving transmission feedback 210. The transmission feedback 210 includes a representation of the actual transmission time for transmitting one or more of the previous data messages of the first type of data conveyed from the source computing device 200 to the target computing device 204.

The representation of the actual transmission time includes a variety of alternatives. An example of a first alternative includes setting the representation as the actual transmission time of a last data message conveyance (e.g., from the source computing device 200 to the target computing device 204). An example of a second alternative includes setting the representation as the actual transmission time of a data message conveyance sent three messages ago. An example of a third alternative includes setting the representation as an average of a last ten (e.g., a plurality) actual transmission times of conveyance of a corresponding ten previous data messages (e.g., a rolling average, or other).

The transmission feedback 210 further includes identity of corresponding one or more transmission paths that conveyed the one or more previous data messages from the source computing device 200 to the target computing device 204. The identity of the transmission path represents identities of each path between the various computing devices. For example, the identity indicates paths S-3, 2-3, and 2-T when representing a path of the previous transmission. In an embodiment, the target computing device 204 generates the transmission feedback 210 to include identity of each path between computing devices, each corresponding actual transmission time between each of the computing devices, and the actual transmission time as an aggregation of the actual transmission times between each of the computing devices (e.g., from the source computing device 200 to the target computing device 204).

Having received the transmission feedback 210, the source computing device 200 compares the actual transmission time with the desired transmission time. The comparison reveals whether the actual transmission time is within the desired transmission time by less than a timing tolerance or different than the desired transmission time by more than the timing tolerance. When different, the actual transmission time is either greater than the desired transmission time by an amount more than the timing tolerance or less than the desired transmission time by the about more than the timing tolerance.

The source computing device 200 obtains the timing tolerance by at least one of several approaches. As an example of a first approach, the source computing device 200 interprets a data request from the target computing device 204, where the data request includes identity of the first type of data, the desired transmission time, and the timing tolerance. As an example of a second approach, the source computing device 200 determines the timing tolerance based on past performance of the proprietary network 10, including establishing the timing tolerance as a smaller number when variance of recent actual transmission times for the data type has been less. As an example of a third approach, the source computing device 200 establishes the timing tolerance based on the data type. For instance, the timing tolerance for a higher priority datatype is established to be less than the timing tolerance associated with a lower priority datatype. The comparison of the actual transmission time to the desired transmission time is discussed in greater detail with reference to FIG. 5C.

Having compared the actual transmission time to the desired transmission time, the source computing device 200 generates upcoming transmission information 212 to include the identity of the transmission path of the previous transmission and a transmission change indicator set to no-change when the actual transmission time is within the timing tolerance of the desired transmission time. The example of no-change is further discussed below. The upcoming transmission information 212 establishes guidance as utilized for an upcoming transmission of a next data message of the first type from the source computing device 200 to the target computing device 204.

Alternatively, when the actual transmission time is greater than the timing tolerance plus the desired transmission time, source computing device 200 generates the upcoming transmission information 212 to include the identity of the transmission path of the previous transmission and the transmission change indicator being set to increase transmission speed. An example of increasing the transmission speed (e.g., to lower subsequent actual transmission times) is discussed in greater detail with reference to FIG. 5D.

Further alternatively, when the actual transmission time is less than the desired transmission time minus the timing tolerance, the source computing device 200 generates the upcoming transmission information 212 to include the identity of the transmission path of the previous transmission and the transmission change indicator being set to decrease transmission speed. An example of decreasing the transmission speed (e.g., to raise subsequent actual transmission times) is discussed in greater detail with reference to FIG. 5E.

In a similar fashion, the above process is utilized to convey data messages of the second type from the source computing device 200 to the target computing device 204. In an example of operation of the processing of the data messages of the second type, the source computing device 200 receives second transmission feedback from the target computing device 204, where the second transmission feedback is regarding a previous transmission of a second data message from the source computing device 200 to the target computing device 204 via the proprietary network 10. The second data message is of the second type of data message (e.g., the home appliance usage information). The second transmission feedback includes a second actual transmission time for transmitting the second data message from the source computing device 200 to the target computing device 204 and identity of a second transmission path that conveyed the second data message from the source computing device 200 to the target computing device 204.

Having received the second transmission feedback, the source computing device 200 compares the second actual transmission time with a second desired transmission time. When the second actual transmission time is within a second timing tolerance of the second desired transmission time, the source computing device 200 generates second upcoming transmission information. The second upcoming transmission information includes the identity of the second transmission path of the previous transmission and a second transmission change indicator set to no-change. The second upcoming transmission information is to be used for an upcoming transmission of a next second data message of the second type from the source computing device 200 to the target computing device 204.

When the second actual transmission time is greater than the second timing tolerance plus the second desired transmission time, the source computing device 200 generates the second upcoming transmission information to include the identity of the second transmission path of the previous transmission and the second transmission change indicator being set to increase transmission speed. When the second actual transmission time is less than the second desired transmission time minus the second timing tolerance, the source computing device 200 generates the second upcoming transmission information to include the identity of the second transmission path of the previous transmission and the second transmission change indicator being set to decrease transmission speed.

The example of the conveying of the next data message of the first type continues where, when the actual transmission time is within the timing tolerance of the desired transmission time, the source computing device 200 sends the next data message and the upcoming transmission information 212 to another computing device of the proprietary network 10. The source computing device 200 utilizes the identity of the transmission path of the previous transmission when the transmission change indicator is set to no-change to select the path for sending of the next data message. The sending includes selecting the other computing device. For example, the source computing device 200 sends the next data message via the path S-3 to the computing device 202-3 when the transmission path identity indicates that the previous path included path S-3 and the transmission change indicator is set to no-change.

Having received the next data message and the upcoming transmission information 212, the other computing device identifies a second other computing device of the proprietary network 10 based on the identity of the transmission path of the previous transmission. For example, the computing device 202-3 identifies the computing device 202-2 when the transmission path identity indicates that the previous path included path 2-3 from the computing device 202-3 to the computing device 202-2.

Having identified the second other computing device, the other computing device sends the next data message and the upcoming transmission information 212 to the second other computing device. In a similar fashion, the computing device 202-2 sends the next data message and the upcoming transmission information 212 to the target computing device 204 to complete the conveyance of the next data message. Having received the next data message, the target computing device 204 once again generates transmission feedback 210 to summarize the actual transmission paths and the actual transmission time for the sending of the next data message to enable the source computing device 200 to process a further next data message of the first data type.

FIG. 5C is a timing diagram illustrating an example of establishing a transmission change indicator when communicating data messages i−1 through i+3 through a proprietary network. The actual transmission time of transmission i−1 is greater than the desired transmission time by more than the timing tolerance. The transmission change indicator is set to increase transmission speed to affect the transmission of the next data message via transmission i.

While the actual transmission time of transmission i is faster than that of transmission i−1 (e.g., benefiting from the setting of the transmission change indicator to increase transmission speed), it is still greater than the desired transmission time by more than the timing tolerance. The transmission change indicator is set to increase transmission speed to affect the transmission of the next data message via transmission i+1.

The actual transmission time of transmission i+1 is less than the desired transmission time by more than the timing tolerance. The speed has been increased too much based on the transmission change indicator being set to increase transmission speed after analyzing transmission i. The transmission change indicator is now set to decrease transmission speed to affect the transmission of the next data message via transmission i+2.

The actual transmission time of transmission i+2 is within the desired transmission time by less than the timing tolerance. This is the desired range for the actual transmission time. The transmission change indicator is now set to no-change to affect the transmission of the next data message via transmission i+3.

The actual transmission time of transmission i+3 is still within the desired transmission time by less than the timing tolerance. The transmission change indicator continues to be set to no-change to affect the transmission of the next data message after transmission i+3.

The generating of the transmission change indicator includes producing a multi-bit indicator to indicate multiple levels of increasing the transmission speed and multiple levels of decreasing the transmission speed. For example, the transmission change indicator is set to a higher level of increasing the transmission speed for transmission i (e.g., based on the actual transmission time of transmission i−1) than the level of increasing the transmission speed for transmission i+1 since the difference between the actual transmission time of the transmission i−1 and the desired transmission time is much greater than the difference between the actual transmission time of the transmission i and the desired transmission time.

Figure 5D:
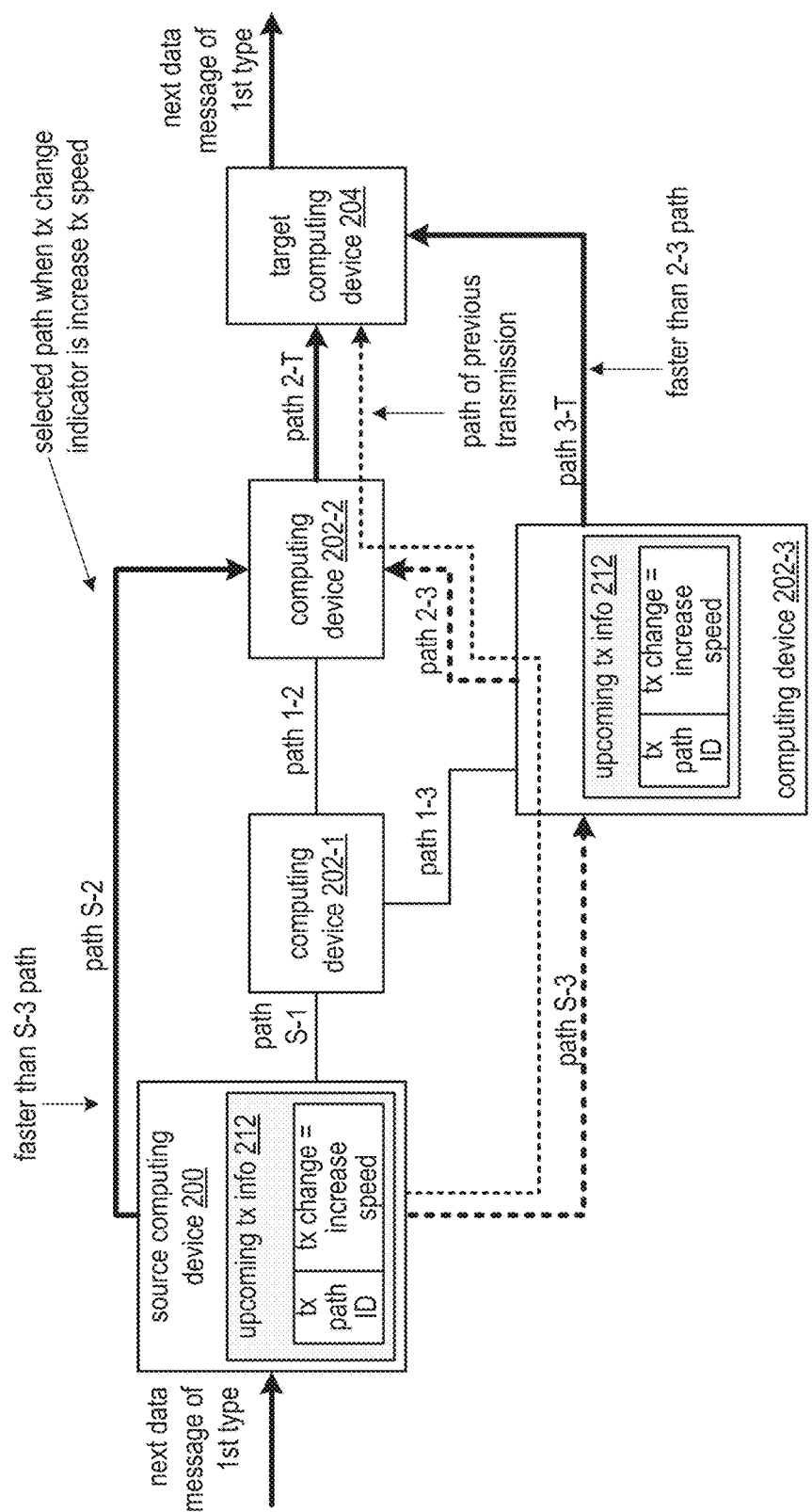

FIG. 5D illustrates an example of the conveying of the data messages where the actual transmission time of the previous data message was slower than the desired transmission time. The example includes the source computing device 200, having set the transmission change indicator to increase transmission speed, identifying a first linked computing device based on the identity of the transmission path of the previous transmission. For example, the source computing device 200 identifies the computing device 202-3 based on the identity of the transmission path (e.g., previous path of a previous transmission).

Having identified the first linked computing device, the source computing device 200 device determines whether sending the next data message to another computing device of the proprietary network 10 has a potential to yield a faster transmission time than sending the next data message to the first linked computing device. The determining includes identifying other paths to other computing devices and comparing estimated transmission times associated with those other paths to an estimated transmission time of the first linked computing device (e.g., associated with the path of the last transmission). For example, the source computing device 200 determines an estimated transmission time associated with path S-2 to the computing device 202-2 and determines another estimated transmission time associated with path S-1 to the computing device 202-1 for comparison to the estimated transmission time of the first linked computing device.

The estimating of the transmission times includes utilizing a previous actual transmission time for at least a portion of the path. For example, the source computing device 200 produces the estimated transmission time for path S-3 based on a previous actual transmission time for the path S-3. The estimating of the transmission times further includes measuring the actual transmission time for the portion of the path. For example, the source computing device 200 initiates a ping sequence to measure the actual transmission time for the path S-2 when a previous actual transmission time is unavailable.

The source computing device 200 further selects one path over another based on a level of the transmission change indicator. For example, the source computing device 200 selects a fastest of two or more other paths when the two or more other paths have estimated transmission times that are faster than the actual transmission time of the previous path and when the transmission change indicator indicates a highest level of increasing the speed. As another example, the source computing device 200 selects a slowest of the two or more other paths when the two or more other paths have estimated transmission times that are faster than the actual transmission time of the previous path and when the transmission change indicator indicates a lowest level of increasing the speed.

When the selection of the other computing device has the potential to yield the faster transmission time, the source computing device 200 sends the next data message and the upcoming transmission information 212 to the other computing device. For example, the source computing device 200 selects the path S-2 to the computing device 202-2 when the estimated transmission time for path S-2 is faster than the path S-3. Having selected the path S-2, the source computing device 200 sends the next data message and the upcoming transmission information 212 to the computing device 202-2 via the path S-2.

When the source computing device 200 selects the path S-2, the other computing device receives the next data message in the upcoming transmission information 212. For example, the computing device 202-2 receives the next data message and the upcoming transmission information 212 from the source computing device 200.

Having received the next data message and the upcoming transmission information 212, the other computing device identifies a second other computing device of the proprietary network 10 based on the target computing device and the transmission change indicator being set to increase transmission speed. The second other computing device includes another computing device or the target computing device. For example, the computing device 202-2 selects the path 2-T to the target computing device 204 over any other path to the target computing device 204 when path 2-T is associated with a fastest estimated transmission time to the target computing device 204.

Having identified the second other computing device, the other computing device sends the next data message and the upcoming transmission information 212 to the second other computing device. For example, the computing device 202-2 sends the next data message and the upcoming transmission information 212 to the target computing device 204.

Alternatively, when the selection of the other computing device does not have the potential to yield the faster transmission time, the source computing device 200 sends the next data message and the upcoming transmission information 212 to the first linked computing device. For example, the source computing device 200 selects the path S-3 to the computing device 202-3 when the path S-3 has a fastest estimated transmission time over that of paths S-2 and S-1.

Having received the next data message and the upcoming transmission information 212, the first linked computing device identifies a second linked computing device based on the identity of the transmission path of the previous transmission. For example, the computing device 202-3 identifies the computing device 202-2 as the second linked computing device via path 2-3 based on the transmission path of the previous transmission.

Having identified the second linked computing device, the first linked computing device determines whether sending the next data message to a second other computing device of the proprietary network has a potential to yield a faster transmission time than sending the next data message to the second linked computing device. For example, the computing device 202-3 determines an estimated transmission time for path 2-3 to the computing device 202-2, identifies the target computing device 204 as the second other computing device, and determines an estimated transmission time for path 3-T to the target computing device 204 indicating that the path 3-T has the potential to yield the faster transmission time as it is directly to the target computing device 204. When the selection of the second other computing device has the potential to yield the faster transmission time, the first linked computing device sends the next data message and the upcoming transmission information 212 to the second other computing device. For example, the computing device 202-3 sends the next data message and the upcoming transmission information 212 via the path 3-T to the target computing device 204, where the target computing device 204 outputs the next data message of the first type.

When the selection of another computing device does not have the potential to yield the faster transmission time, the first linked computing device sends the next data message and the upcoming transmission information 212 to the second linked computing device. For example, the computing device 202-3 sends the next data message and the upcoming transmission information 212 via the path 2-3 to the computing device 202-2 when that path is expected to have the potential to yield the faster transmission time. Having received the data message, the computing device 202-2 sends the data message to the target computing device 204, where the target computing device 204 outputs the next data message of the first type.

Figure 5E:
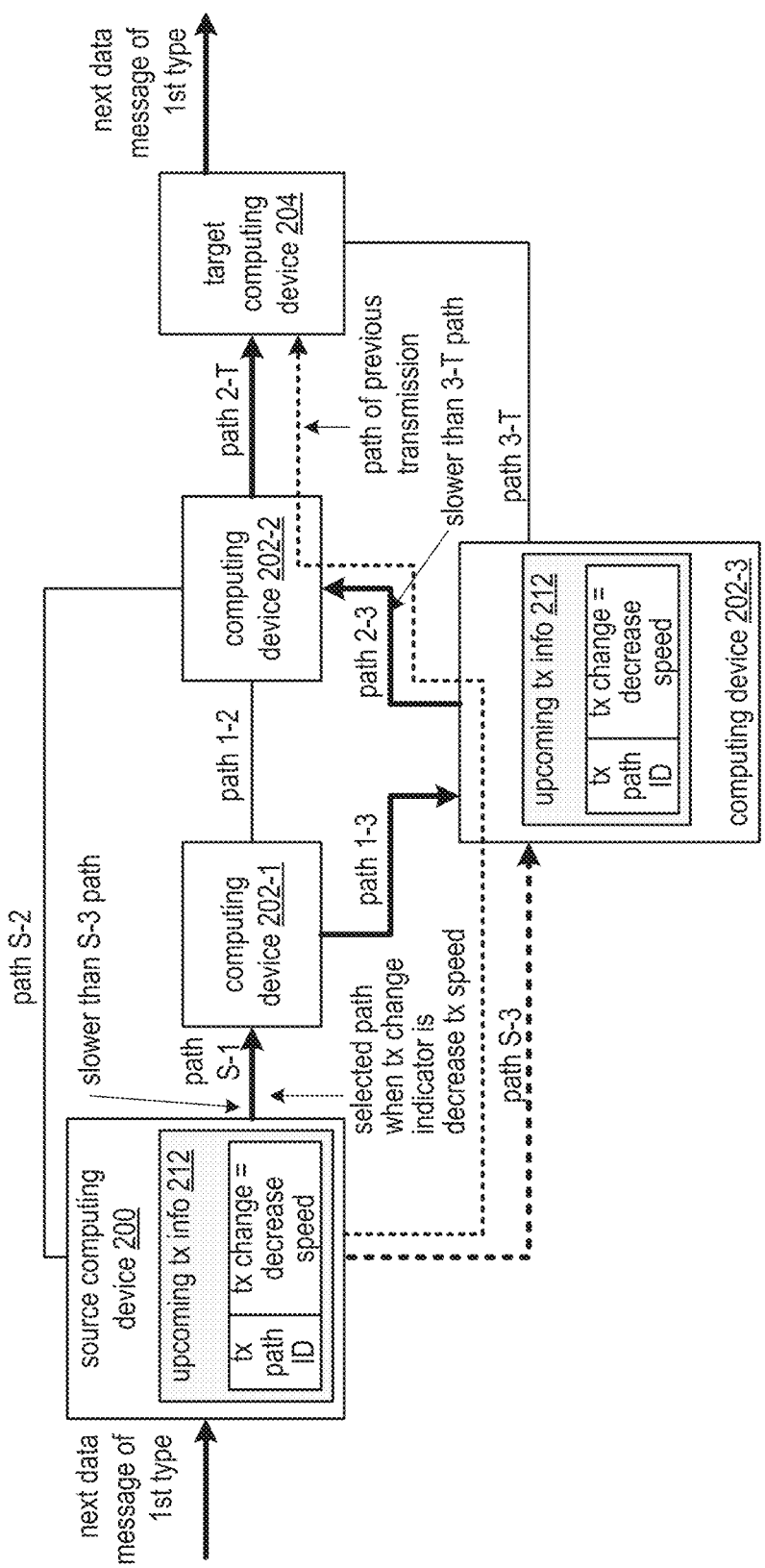

FIG. 5E illustrates an example of the conveying of the data messages where the actual transmission time of the previous data message was faster than the desired transmission time. The example includes the source computing device 200, having set the transmission change indicator to decrease transmission speed, identifying a first linked computing device based on the identity of the transmission path of the previous transmission. For example, the source computing device 200 identifies the computing device 202-3 based on the identity of the transmission path (e.g., previous path of a previous transmission).

Having identified the first linked computing device, the source computing device 200 device determines whether sending the next data message to another computing device of the proprietary network has a potential to yield a slower transmission time than sending the next data message to the first linked computing device. For example, the source computing device 200 determines that an estimated transmission time of sending the next data message via the path S-1 to the computing device 202-1 is slower than an estimated transmission time of sending the next data message via the path S-3 to the computing device 202-3. The determining further includes comparing estimated transmission times of any other paths (e.g., path S-2 to the computing device 202-2) to the estimated transmission time of sending the next data message via the path S-3 to the computing device 202-3.

When the selection of the other computing device has the potential to yield the slower transmission time, the source computing device 200 sends the next data message and the upcoming transmission information 212 to the other computing device. For example, the source computing device 200 sends the next data message and the upcoming transmission information 212 to the computing device 202-1 when the path S-1 is slower.

Having received the next data message and the upcoming transmission information, the other computing device identifies a second other computing device of the proprietary network 10 based on the target computing device and the transmission change indicator being set to decrease transmission speed. Candidate computing devices for the second other computing device includes another computing device or the target computing device 204. For example, the computing device 202-1 identifies both computing devices 202-2 and 202-3 as candidate second other computing devices along paths to the target computing device 204. The computing device 202-1 further identifies that a path utilizing the computing device 202-3 can have a slower estimated transmission time consistent with the transmission change indicator been set to decrease transmission speed.

Having identified the second other computing device, the other computing device sends the next data message and the upcoming transmission information 212 to the second other computing device. For example, the computing device 202-1 sends the next data message and the upcoming transmission information 212 to the computing device 202-3.

When the selection of the other computing device does not have the potential to yield the slower transmission time, the source computing device 200 sends the next data message and the upcoming transmission information to the first linked computing device. For example, the source computing device 200 sends the next data message and the upcoming transmission information 212 via the path S-3 to the computing device 202-3.

Having received the next data message on the upcoming transmission information 212, the first linked computing device identifies a second linked computing device based on the identity of the transmission path of the previous transmission. For example, the computing device 202-3 identifies the computing device 202-2 based on the identity of the path 2-3 of the transmission path of the previous transmission.

Having identified the second linked computing device, the first linked computing device determines whether sending the next data message to a second other computing device of the proprietary network has a potential to yield a slower transmission time than sending the next data message to the second linked computing device. Candidates for the second other computing device includes another computing device or the target computing device 204. For example, the computing device 202-3 determines that sending the next data message to the target computing device 204 does not have the potential to yield the slower transmission time than sending the next data message to the computing device 202-2.

When the selection of the second other computing device has the potential to yield the slower transmission time, the first linked computing device sends the next data message and the upcoming transmission information to the second other computing device. For example, the computing device 202-3 sends the next data message and the upcoming transmission information 212 directly to the target computing device 204 utilizing the path 3-T when that path is estimated to have a slower transmission time than sending the next data message in the upcoming transmission information 212 via path 2-3 to the computing device 202-2 and then on to the target computing device 204 utilizing path 2-T.

When the selection of another computing device (e.g., the target computing device or any another computing device) does not have the potential to yield the slower transmission time, the first linked computing device sends the next data message and the upcoming transmission information 212 to the second linked computing device. For example, having determined that selecting the target computing device 204 does not have the potential to yield the slower transmission time as selecting the computing device 202-2, the computing device 202-3 sends the next data message in the upcoming transmission information 212 to the computing device 202-2. In a similar fashion, the computing device 202-2 sends the next data message on the upcoming transmission information 212 utilizing the path 2-T to the target computing device 204 where the target computing device 204 delivers next data message as the next data message of the first type.

The examples described above in conjunction with one or more processing modules of one or more computing devices can alternatively be performed by other modules of the proprietary network 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by the one or more processing modules of the one or more computing devices of the proprietary network 10, cause the one or more computing devices to perform any or all of the examples described above.

It is noted that terminologies as may be used herein such as stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    receiving, by a source computing device of a proprietary network, transmission feedback from a target computing device of the proprietary network, wherein:
        the transmission feedback is regarding a previous transmission of a data message from the source computing device to the target computing device via the proprietary network,
        the data message is of a first type of data message, and
        the transmission feedback includes an actual transmission time for transmitting the data message from the source computing device to the target computing device and identity of a transmission path that conveyed the data message from the source computing device to the target computing device;
    comparing, by the source computing device, the actual transmission time with a desired transmission time;
    when the actual transmission time is within a timing tolerance of the desired transmission time, generating, by the source computing device, upcoming transmission information that includes the identity of the transmission path of the previous transmission and a transmission change indicator set to no-change, wherein the upcoming transmission information is to be used for an upcoming transmission of a next data message of the first type from the source computing device to the target computing device;
    when the actual transmission time is greater than the timing tolerance plus the desired transmission time, generating, by the source computing device, the upcoming transmission information to include the identity of the transmission path of the previous transmission and the transmission change indicator being set to increase transmission speed; and
    when the actual transmission time is less than the desired transmission time minus the timing tolerance, generating, by the source computing device, the upcoming transmission information to include the identity of the transmission path of the previous transmission and the transmission change indicator being set to decrease transmission speed.

2. The method of claim 1 further comprises:
    sending, by the source computing device, the next data message and the upcoming transmission information to another computing device of the proprietary network in accordance with the identity of the transmission path of the previous transmission when the transmission change indicator is set to no-change.

3. The method of claim 2 further comprises:
    receiving, by the other computing device, the next data message and the upcoming transmission information;
    identifying, by the other computing device, a second other computing device of the proprietary network based on the identity of the transmission path of the previous transmission; and
    sending, by the other computing device, the next data message and the upcoming transmission information to the second other computing device.

4. The method of claim 1 further comprises:
    when the transmission change indicator is set to increase transmission speed:
        identifying, by the source computing device, a first linked computing device based on the identity of the transmission path of the previous transmission;
        determining, by the source computing device, whether sending the next data message to another computing device of the proprietary network has a potential to yield a faster transmission time than sending the next data message to the first linked computing device;
        when selection of the other computing device has the potential to yield the faster transmission time, sending, by the source computing device, the next data message and the upcoming transmission information to the other computing device; and
        when the selection of the other computing device does not have the potential to yield the faster transmission time, sending, by the source computing device, the next data message and the upcoming transmission information to the first linked computing device.

5. The method of claim 4 further comprises:
    receiving, by the other computing device, the next data message and the upcoming transmission information;
    identifying, by the other computing device, a second other computing device of the proprietary network based on the target computing device and the transmission change indicator being set to increase transmission speed; and
    sending, by the other computing device, the next data message and the upcoming transmission information to the second other computing device.

6. The method of claim 4 further comprises:
    receiving, by the first linked computing device, the next data message and the upcoming transmission information;
    identifying, by the first linked computing device, a second linked computing device based on the identity of the transmission path of the previous transmission;
    determining, by the first linked computing device, whether sending the next data message to a second other computing device of the proprietary network has a potential to yield a faster transmission time than sending the next data message to the second linked computing device;
    when selection of the second other computing device has the potential to yield the faster transmission time, sending, by the first linked computing device, the next data message and the upcoming transmission information to the second other computing device; and
    when selection of another computing device does not have the potential to yield the faster transmission time, sending, by the first linked computing device, the next data message and the upcoming transmission information to the second linked computing device.

7. The method of claim 1 further comprises:

when the transmission change indicator is set to decrease transmission speed:

identifying, by the source computing device, a first linked computing device based on the identity of the transmission path of the previous transmission;

determining, by the source computing device, whether sending the next data message to another computing device of the proprietary network has a potential to yield a slower transmission time than sending the next data message to the first linked computing device;

when selection of the other computing device has the potential to yield the slower transmission time, sending, by the source computing device, the next data message and the upcoming transmission information to the other computing device; and when the selection of the other computing device does not have the potential to yield the slower transmission time, sending, by the source computing device, the next data message and the upcoming transmission information to the first linked computing device.

8. The method of claim 7 further comprises:

receiving, by the other computing device, the next data message and the upcoming transmission information;

identifying, by the other computing device, a second other computing device of the proprietary network based on the target computing device and the transmission change indicator being set to decrease transmission speed; and sending, by the other computing device, the next data message and the upcoming transmission information to the second other computing device.

9. The method of claim 7 further comprises:

receiving, by the first linked computing device, the next data message and the upcoming transmission information;

identifying, by the first linked computing device, a second linked computing device based on the identity of the transmission path of the previous transmission;

determining, by the first linked computing device, whether sending the next data message to a second other computing device of the proprietary network has a potential to yield a slower transmission time than sending the next data message to the second linked computing device;

when selection of the second other computing device has the potential to yield the slower transmission time, sending, by the first linked computing device, the next data message and the upcoming transmission information to the second other computing device; and when selection of another computing device does not have the potential to yield the slower transmission time, sending, by the first linked computing device, the next data message and the upcoming transmission information to the second linked computing device.

10. The method of claim 1 further comprises:

generating, by the source computing device, the transmission change indicator to be a multi-bit indicator to indicate multiple levels of increasing the transmission speed and multiple levels of decreasing the transmission speed.

11. The method of claim 1 further comprises:

receiving, by the source computing device, second transmission feedback from the target computing device of the proprietary network, wherein:

the second transmission feedback is regarding a previous transmission of a second data message from the source computing device to the target computing device via the proprietary network, the second data message is of a second type of data message, and the second transmission feedback includes a second actual transmission time for transmitting the second data message from the source computing device to the target computing device and identity of a second transmission path that conveyed the second data message from the source computing device to the target computing device;

comparing, by the source computing device, the second actual transmission time with a second desired transmission time;

when the second actual transmission time is within a second timing tolerance of the second desired transmission time, generating, by the source computing device, second upcoming transmission information that includes the identity of the second transmission path of the previous transmission and a second transmission change indicator set to no-change, wherein the second upcoming transmission information is to be used for an upcoming transmission of a next second data message of the second type from the source computing device to the target computing device;

when the second actual transmission time is greater than the second timing tolerance plus the second desired transmission time, generating, by the source computing device, the second upcoming transmission information to include the identity of the second transmission path of the previous transmission and the second transmission change indicator being set to increase transmission speed; and when the second actual transmission time is less than the second desired transmission time minus the second timing tolerance, generating, by the source computing device, the second upcoming transmission information to include the identity of the second transmission path of the previous transmission and the second transmission change indicator being set to decrease transmission speed.

12. A computer readable memory comprises:

a first memory element that stores operational instructions that, when executed by a processing module of a source computing device of a proprietary network, causes the processing module of the source computing device to:

receive transmission feedback from a target computing device of the proprietary network, wherein:

the transmission feedback is regarding a previous transmission of a data message from the source computing device to the target computing device via the proprietary network, the data message is of a first type of data message, and the transmission feedback includes an actual transmission time for transmitting the data message from the source computing device to the target computing device and identity of a transmission path that conveyed the data message from the source computing device to the target computing device; and a second memory element that stores operational instructions that, when executed by the processing module of the source computing device, causes the processing module of the source computing device to:
compare the actual transmission time with a desired transmission time;
when the actual transmission time is within a timing tolerance of the desired transmission time, generate upcoming transmission information that includes the identity of the transmission path of the previous transmission and a transmission change indicator set to no-change, wherein the upcoming transmission information is to be used for an upcoming transmission of a next data message of the first type from the source computing device to the target computing device;
when the actual transmission time is greater than the timing tolerance plus the desired transmission time, generate the upcoming transmission information to include the identity of the transmission path of the previous transmission and the transmission change indicator being set to increase transmission speed; and
when the actual transmission time is less than the desired transmission time minus the timing tolerance, generate the upcoming transmission information to include the identity of the transmission path of the previous transmission and the transmission change indicator being set to decrease transmission speed.

13. The computer readable memory of claim 12 further comprises:
a third memory element stores operational instructions that, when executed by the processing module of the source computing device, causes the processing module of the source computing device to:
send the next data message and the upcoming transmission information to another computing device of the proprietary network in accordance with the identity of the transmission path of the previous transmission when the transmission change indicator is set to no-change.

14. The computer readable memory of claim 13 further comprises:
a fourth memory element stores operational instructions that, when executed by a processing module of the other computing device, causes the processing module of the other computing device to:
receive the next data message and the upcoming transmission information;
identify a second other computing device of the proprietary network based on the identity of the transmission path of the previous transmission; and
send the next data message and the upcoming transmission information to the second other computing device.

15. The computer readable memory of claim 12 further comprises:
a third memory element stores operational instructions that, when executed by the processing module of the source computing device, causes the processing module of the source computing device to:
when the transmission change indicator is set to increase transmission speed:
identify a first linked computing device based on the identity of the transmission path of the previous transmission;
determine whether sending the next data message to another computing device of the proprietary network has a potential to yield a faster transmission time than sending the next data message to the first linked computing device;
when selection of the other computing device has the potential to yield the faster transmission time, send the next data message and the upcoming transmission information to the other computing device; and
when the selection of the other computing device does not have the potential to yield the faster transmission time, send the next data message and the upcoming transmission information to the first linked computing device.

16. The computer readable memory of claim 15 further comprises:
a fourth memory element stores operational instructions that, when executed by a processing module of the other computing device, causes the processing module of the other computing device to:
receive the next data message and the upcoming transmission information;
identify a second other computing device of the proprietary network based on the target computing device and the transmission change indicator being set to increase transmission speed; and
send the next data message and the upcoming transmission information to the second other computing device.

17. The computer readable memory of claim 15 further comprises:
a fourth memory element stores operational instructions that, when executed by a processing module of the first linked computing device, causes the processing module of the first linked computing device to:
receive the next data message and the upcoming transmission information;
identify a second linked computing device based on the identity of the transmission path of the previous transmission;
determine whether sending the next data message to a second other computing device of the proprietary network has a potential to yield a faster transmission time than sending the next data message to the second linked computing device;
when selection of the second other computing device has the potential to yield the faster transmission time, send the next data message and the upcoming transmission information to the second other computing device; and
when selection of another computing device does not have the potential to yield the faster transmission time, send the next data message and the upcoming transmission information to the second linked computing device.

18. The computer readable memory of claim 12 further comprises:
a third memory element stores operational instructions that, when executed by the processing module of the source computing device, causes the processing module of the source computing device to:
when the transmission change indicator is set to decrease transmission speed:
identify a first linked computing device based on the identity of the transmission path of the previous transmission;

determine whether sending the next data message to another computing device of the proprietary network has a potential to yield a slower transmission time than sending the next data message to the first linked computing device;

when selection of the other computing device has the potential to yield the slower transmission time, send the next data message and the upcoming transmission information to the other computing device; and when the selection of the other computing device does not have the potential to yield the slower transmission time, send the next data message and the upcoming transmission information to the first linked computing device.

19. The computer readable memory of claim 18 further comprises:

a fourth memory element stores operational instructions that, when executed by a processing module of the other computing device, causes the processing module of the other computing device to:

receive the next data message and the upcoming transmission information;

identify a second other computing device of the proprietary network based on the target computing device and the transmission change indicator being set to decrease transmission speed; and send the next data message and the upcoming transmission information to the second other computing device.

20. The computer readable memory of claim 18 further comprises:

a fourth memory element stores operational instructions that, when executed by a processing module of the first linked computing device, causes the processing module of the first linked computing device to:

receive the next data message and the upcoming transmission information;

identify a second linked computing device based on the identity of the transmission path of the previous transmission;

determine whether sending the next data message to a second other computing device of the proprietary network has a potential to yield a slower transmission time than sending the next data message to the second linked computing device;

when selection of the second other computing device has the potential to yield the slower transmission time, send the next data message and the upcoming transmission information to the second other computing device; and when selection of another computing device does not have the potential to yield the slower transmission time, send the next data message and the upcoming transmission information to the second linked computing device.

21. The computer readable memory of claim 12 further comprises:

a third memory element stores operational instructions that, when executed by the processing module of the source computing device, causes the processing module of the source computing device to:

generate the transmission change indicator to be a multi-bit indicator to indicate multiple levels of increasing the transmission speed and multiple levels of decreasing the transmission speed.

22. The computer readable memory of claim 12 further comprises:

the first memory element further stores operational instructions that, when executed by the processing module of the source computing device, causes the processing module of the source computing device to:

receive second transmission feedback from the target computing device of the proprietary network, wherein:

the second transmission feedback is regarding a previous transmission of a second data message from the source computing device to the target computing device via the proprietary network, the second data message is of a second type of data message, and the second transmission feedback includes a second actual transmission time for transmitting the second data message from the source computing device to the target computing device and identity of a second transmission path that conveyed the second data message from the source computing device to the target computing device; and the second memory element further stores operational instructions that, when executed by the processing module of the source computing device, causes the processing module of the source computing device to:

compare the second actual transmission time with a second desired transmission time;

when the second actual transmission time is within a second timing tolerance of the second desired transmission time, generate second upcoming transmission information that includes the identity of the second transmission path of the previous transmission and a second transmission change indicator set to no-change, wherein the second upcoming transmission information is to be used for an upcoming transmission of a next second data message of the second type from the source computing device to the target computing device;

when the second actual transmission time is greater than the second timing tolerance plus the second desired transmission time, generate the second upcoming transmission information to include the identity of the second transmission path of the previous transmission and the second transmission change indicator being set to increase transmission speed; and when the second actual transmission time is less than the second desired transmission time minus the second timing tolerance, generate the second upcoming transmission information to include the identity of the second transmission path of the previous transmission and the second transmission change indicator being set to decrease transmission speed.

* * * * *